United States Patent

[11] 3,598,040

[72] Inventor Albert DeMets
    105, Hogestraat, Kachtem, Belgium
[21] Appl. No. 737,125
[22] Filed June 14, 1968
[45] Patented Aug. 10, 1971
[32] Priority June 16, 1967, May 31, 1968
[33] Belgium
[31] 700,055 and 59,119

[54] CONTINUOUS-WORKING PRESS, PARTICULARLY FOR THE MANUFACTURE OF FIBER PLATES, AND PLANT PROVIDED WITH SUCH A PRESS
6 Claims, 5 Drawing Figs.

[52] U.S. Cl. .................................. 100/154, 144/281
[51] Int. Cl. .................................. B30b 5/06
[50] Field of Search .......................... 100/153, 154, 151, 152; 144/281.2; 18/4 B

[56] References Cited
UNITED STATES PATENTS

| 271,387 | 1/1883 | Wilcox | 100/154 X |
| 1,326,231 | 12/1919 | Raalten | 100/154 |
| 1,659,733 | 2/1928 | Harbeck | 100/154 |
| 2,981,307 | 4/1961 | Malarkey, Jr. | 100/154 X |
| 3,063,362 | 11/1962 | Guettler | 100/154 |
| 3,106,152 | 10/1963 | Coffelt | 100/154 X |

Primary Examiner—Edward L. Roberts
Attorney—Sughrue, Rothwell, Mion, Zinn & Macpeak ABSTRACT: A press having relatively movable frames and rollers is provided for manufacturing fiber plates and the like. The movable upper frame is connected to the bearings supporting the first and last upper rollers and provides relative adjustment of pressure and belt tension. Hydraulic cylinders and pistons suspend the movable frame from the stationary frame of the press.

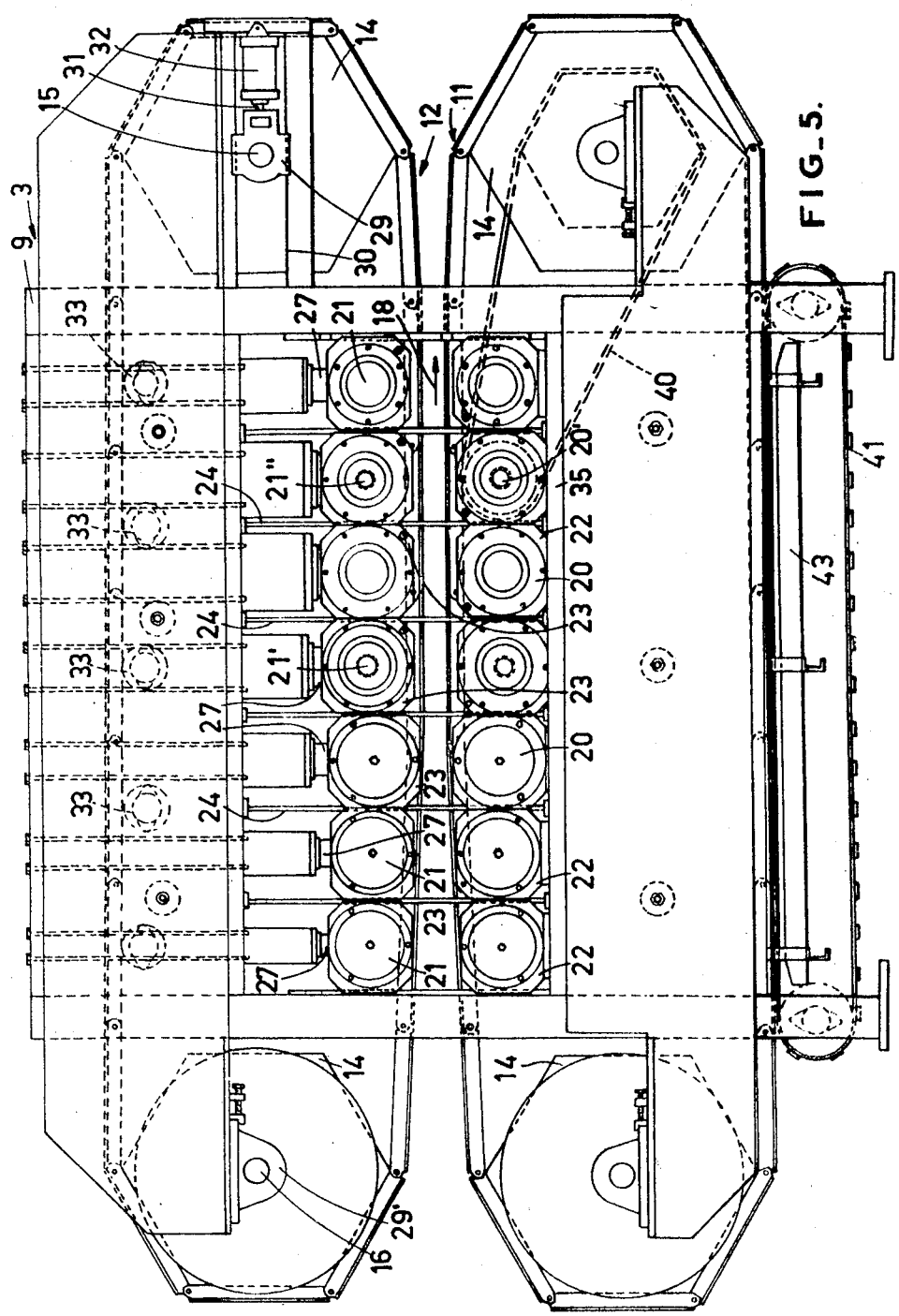

CONTINUOUS-WORKING PRESS, PARTICULARLY FOR THE MANUFACTURE OF FIBER PLATES, AND PLANT PROVIDED WITH SUCH A PRESS

The present invention relates to a continuous-working press, particularly to a press for the manufacture of fiber plates, which is comprised of endless bands arranged one above the other about horizontal axes in parallel relationship, such as flat chains, whereby those parts of both these bands directed towards one another, between which the fiber plates may be pressed, move in the same direction.

The invention provides a press of the above-mentioned type which permits the installations for the manufacture of fibers plates, reduce the maintenance thereof as well as lower the initial cost of large installations, relative to similar installations with the same capacity.

For this purpose, there are provided pressure rollers located one besides the other and the axis of which extends in parallel relationship with the axes of the bands, which rollers are mounted on that side of at least one of the band parts, which is opposite to the other part and act vertically on the first part making it possible to regulate the spacing between both parts directed towards one another and the pressure to be applied to the material to be compressed between these parts.

Usefully, the distance between the axes of at least one band is adjustable, so as to be able to regulate under the influence of the pressure rollers acting on this band, the spacing between those parts of the bands directed towards one another and simultaneously to retain continuously the band under tension.

In an advantageous embodiment of the invention, the axes of both endless bands are mounted on a fixed frame of the press.

The invention also relates to a plant for the manufacture of fiber plates provided with the above-described press.

This plant is mainly characterized by a spreading machine for fibers and a device located after the press, for dividing into plates the fiber cake compressed in this press.

The use of the above-described press as prepress in a plant for the manufacture of fiber plates offers the important advantage that there is no more a capacity limitation of the plant, as it is the case with an usual discontinuous-working prepress, because the pressing time of the same must be taken into account.

Other details and feature of the invention will stand out from the description given below by way of non limitative example and with reference to the accompanying drawings, in which:

FIG. 5 is a side view of another embodiment of the prepress according to the invention.

In the various figures, the same reference numerals pertain to the same or similar elements.

Figure 1:
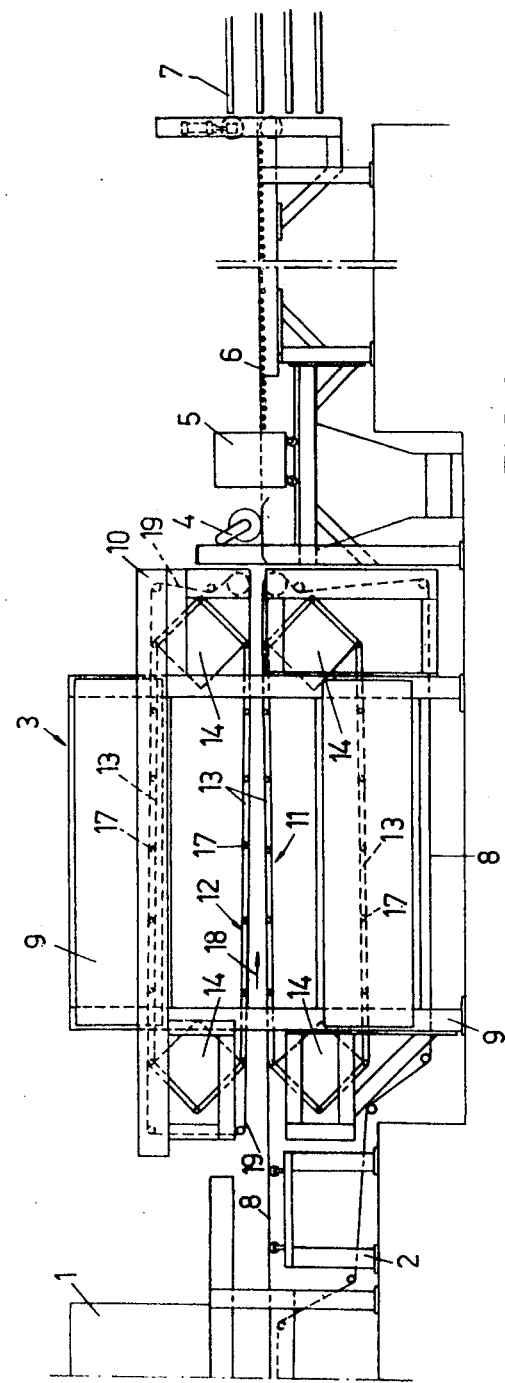
FIG. 1 is a diagrammatic side view of a plant with a prepress, according to the invention, for the manufacture of fiber plates.

In FIG. 1 is shown a plant for the manufacture of fiber plates, which is comprised of a spreading machine 1, a weighing machine 2, a prepress 3, a breadthwise sawing machine 4, a lengthwise sawing machine 5, a conveyor band 6, a loading rack 7 and a heated main press, not shown in the figures.

By means of the spreading machine 1, wood or other fibers, eventually mixed with accessory materials, for example a binding agent, are distributed in a layer of substantially constant thickness over a conveyor band 8 and brought to the press 3 to be compressed into a cake. The compressed cake is then sawn to size by the sawing machines 4 and 5. The plates thus obtained are then conveyed by means of the conveyor band to the loading rack 7 to be converted afterwards in the heated main press, into finished completely stiff fiber plates. The weighing apparatus 2 allows, for example by means of an electric or electronic regulating apparatus, to regulate the output of the spreading machine 1 and the speed of the band 8 so as to minimize the variations in the thickness of the layer of spread fibers.

The prepress 3 is mainly comprised of a fixed frame 9 and a vertically movable frame 10 thereon. These frames 9 and 10 each bear a closed flat wide chain 11, 12, which chains are formed or heavy steel plates 13 hinged by pairs to one another. These chains 11 and 12 are located one above the other and run each over square wheels or pulleys 14 which are mounted in the center thereof on horizontal axes 15 and 16.

The length of the sides of the pulleys 14 is substantially equal to the length of the plates 13, while the hinges 17 between two succeeding plates 13 coincide with the corners of these pulleys 14, at the moment where these plate 13 engage the pulleys 14. Those parts of the chains 11 and 12 directed towards one another move along the direction of arrow 18. The spacing between both these parts decreases progressively along the direction of arrow 18 down to a constant value adjacent the axes 16, which forms the final thickness of the fiber plate to be pressed, not shown in the figures. The fiber layer formed on the conveyor band 8 is then lead thereon between the chains 11 and 12 to be compressed progressively and continuously by these chains into a solid cake. The conveyor band 8 rests in the press 3 on the chain 11 and is driven in the same direction and at the same linear speed as this chain. This band 8 ensures a perfectly even surface on that side of the compressed fiber cake which engages this band 8. For this same purpose, there is provided on the chain 12 a cloth 19 which is pushed against the lower part of the chain 12 and forms a closed ring around the same. This cloth 19 is also driven at the same speed and along the same direction as the chain 12.

On the sides directed away from one another of both parts directed towards one another of the chains 11 and 12 are provided in parallel relationship to the axes 15 and 16 thereof, pressure rollers 20 and 21 located next to one another, the ends of which extend outwards of the chains 11 and 12 and are rotatably mounted in bearings 22 and 23.

The bearings 22 rest freely on a stringer 35 of the fixed frame 9, so as to permit a small degree of flexibility between bearing 22 of a single roller while the bearings 23 of the pressure rollers 21 are movable up and down between vertical fixed guides 24 which are mounted on the fixed frame 9 between two succeeding bearings 23. These bearings 23 rest freely upon distance battens 25 which are located between two bearings 22 and 23 arranged one above the other, for regulating the thickness and the relative thickness reduction along the direction of arrow 18 of the cake to be pressed between the chains 11 and 12.

The movable frame 10 is supported by the end rollers 21 through bearing 23 and supports 26. Thus, the vertical spacing between the axis 15 of the chain 12 and the first roller 21 as well as the vertical spacing between the axis 16 and the last roller 21 are always constant since there exists a rigid connection between the bearings 23, support 26 and the I-beam of the frame 10. Further, the plates 13 which leave the pulleys rotating about the axis 15 over which runs the chain 12 and the plates 13 which are about to undergo a change of direction about the pulleys 14 of the axis 16 around which rotates the chain 12, always take the same relative position. The last-named plates 13 are located for example always in an horizontal position, while the first-named plates 13 always have the same slanting.

Each one of the rollers 21 is operated separately by two vertically acting hydraulically operated pistons 27 which act upon those two bearings 23 wherein both ends of these rollers rotate and which slide in cylinders 28 mounted on the fixed frame 9. By regulating the pressure on a pair of these pistons 27 which act upon one and the same roller 21, a corresponding pressure is applied on a determined location of the chain 12. These pressure rollers and the pistons acting thereon thus allow over the whole length of the pressure zone of the press 3, determined by that part of the chain 12 which is directed towards the chain 11, to adjust the value of the exerted pressure from one spot to another and consequently to obviate local overpressures when pressing the fiber cakes.

Figure 2:
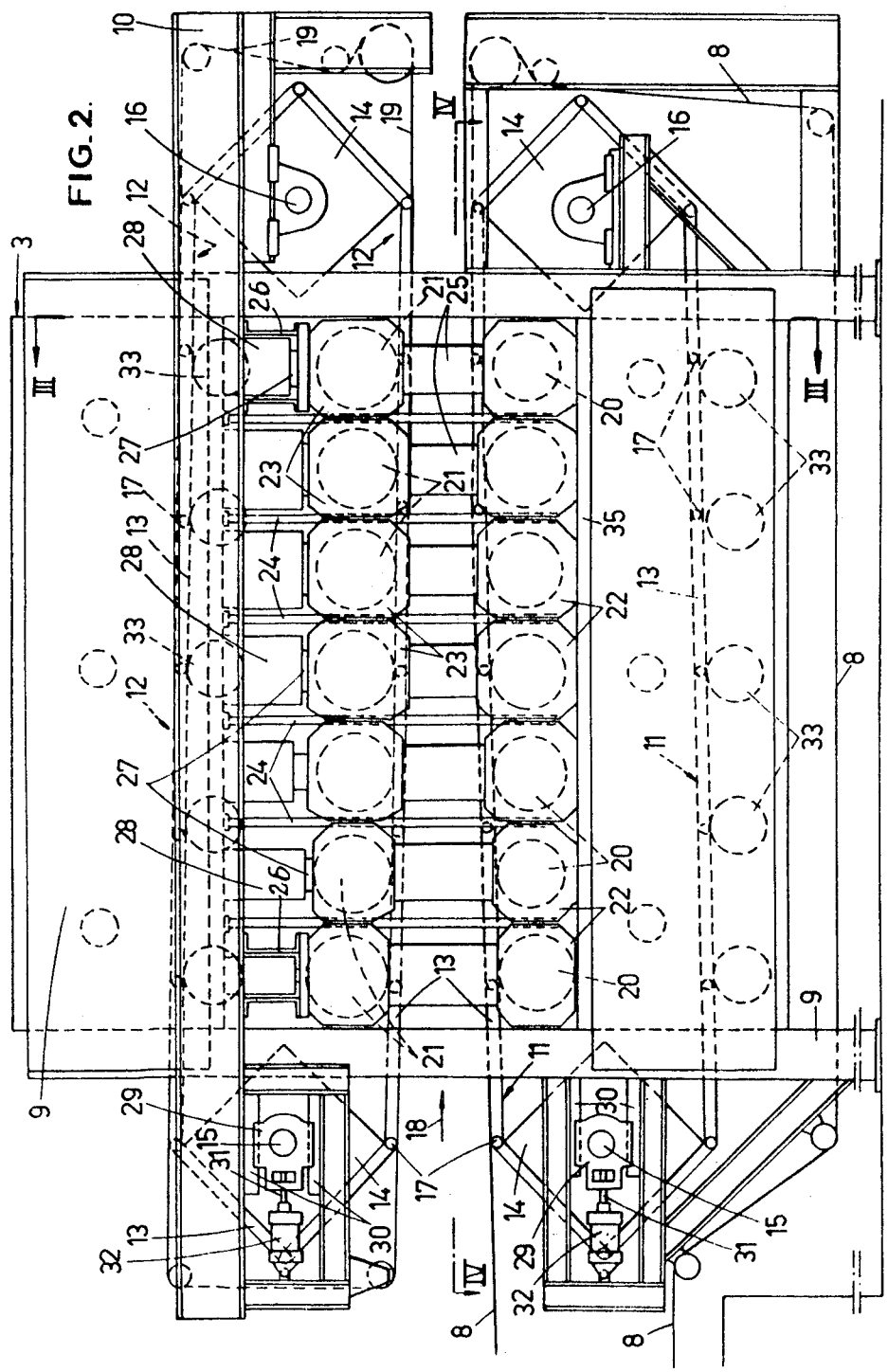
FIG. 2 is a side view, on a larger scale, with partial section, of the prepress according to the invention shown in FIGURE 1.
Figure 3:
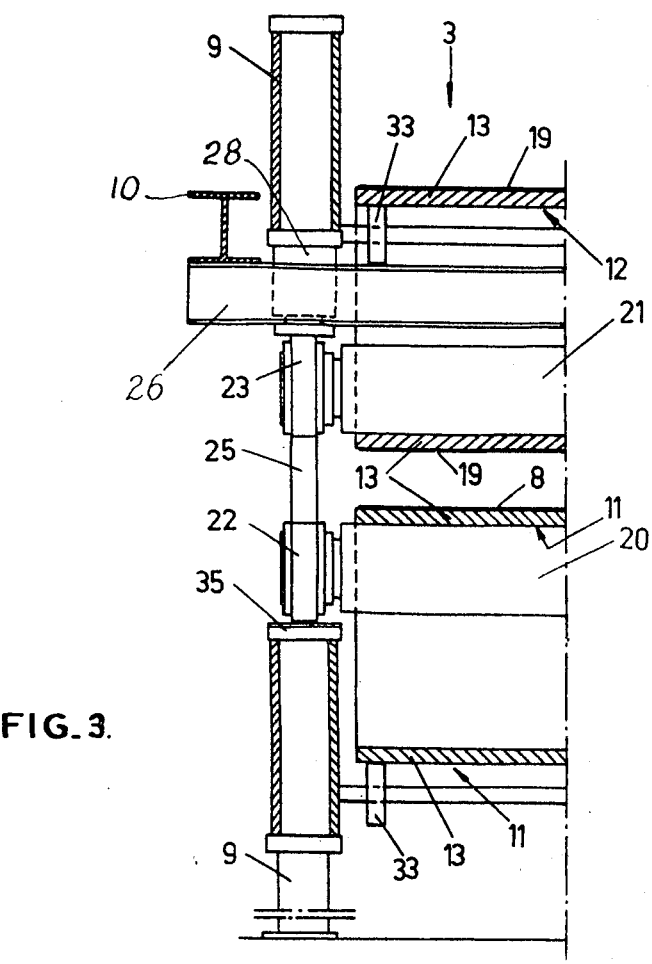
FIG. 3 is a partial section along line III–III in FIG. 2.
Figure 4:
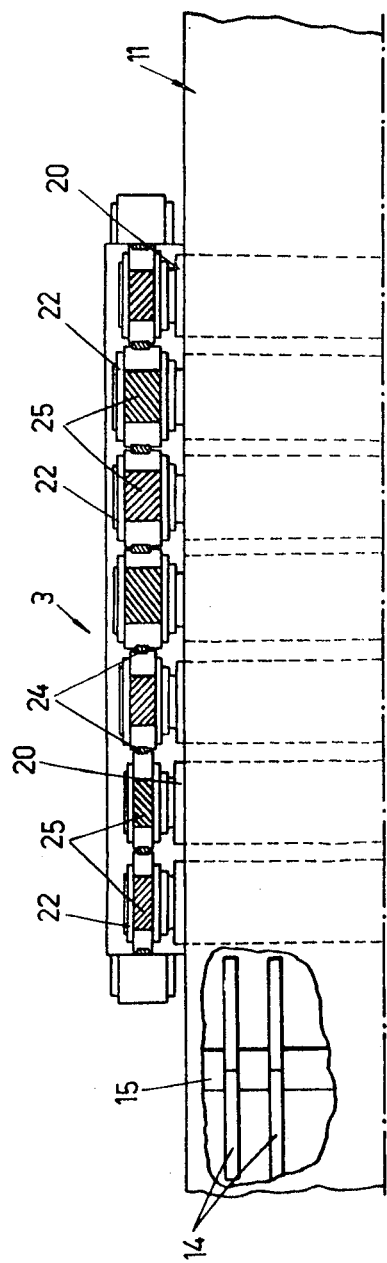
FIG. 4 is an horizontal view along line IV–IV in FIGURE 2.

Referring to FIG. 3, the relative positions of the bearings 22 and 23, fixed frame 9 and movable frame 10 can be determined. The hydraulic cylinder 28 and piston 27 are connected directly to the frame 9. The u-shaped support 26 is connected to the upper bearing 23 and carries the I-beam of the movable frame 10. The rollers 33 are spaced from the support 26 as seen in FIG. 2 and do not interfere with the operation of the vertical adjustment of the bearings 23. The bearings 23 support the rollers 21 and battens 25 may be inserted to accurately maintain the desired distance between rollers 20 and 21.

The axes 15 of the chain 11 and of the chain 12 are mounted in bearings 29 which may move in a guiding way 30 at right angle to the axes 15, along a horizontal direction, and which are connected to air-controlled pistons 31, which may in turn slide along the said direction, inside cylinders 32 fastened on the corresponding frame 9 and 10, respectively. By adjusting the pressure applied on these pistons 31, the chains 11 and 12 are always maintained taut by their rotating movement about the axes 15 and 16. The linear speed variations of the chains 11 and 12, which are due to the square shape of the pulleys 14 are also compensated for the most part by these pistons.

The mutually opposed parts of the chains 11 and 12 are also further guided over free-rotating supporting wheels 33 which support these parts.

Some of the pressure rollers 20 and 21 are also freely rotatable in their bearings and they are rotated about the axis thereof by friction with the chains 11 and 12, respectively, while other rollers are directly driven so as to keep the tensile force applied to the chains 11 and 12 below a maximum value.

The driving of these pressure rollers is made preferably from a central driving device, not shown in the drawings, which also drives the axes 16 of the chains as well as the conveyor band 19.

The pressure exerted by such a prepress 3 on a fiber cake may reach 35 kg. per cm² and more. This press allows to replace, in plants for the manufacture of fiber plates, the known prestampers as well as possible the uncontinuous working main presses by a single continuous working press according to the invention. The construction of the plants is thus substantially made simpler. The fact that the fiber cake is sawn, after being shaped under high pressure by the press 3, ensures that the cake does not undergo any distortion during the subsequent handling and the dimensions obtained remain substantially constant, so that the loss by the trimming to size of the fiber plates is minimized.

It is also possible to heat the chains 11 and 12 either by radiation or possibly by conduction and, for the formation of relatively thin fiber plates, to replace the known uncontinuous working main presses by the continuous working press according to the invention.

In FIG. 5 is shown another embodiment of the prepress 3 according to the invention. This prepress 3 is comprised mainly of a fixed frame 9 that supports two large closed chains 11 and 12, arranged one above the other. The chains 11 and 12 are of the same kind as the ones of the prepress 3 shown in FIG. 2 and run over hexagonal pulleys or wheels 14 which are also mounted in the center thereof on horizontal axes 15 and 16. The ends of the axes 15 and 16 are rotatable in bearings 29 and 29' mounted on the fixed frame 9. The bearings 29 of the axis 15 of the upper chain 12 are movable in a guide way 30, along an horizontal direction at right angle to the axis 15 and each one thereof is connected to an air-controlled piston 31 sliding inside an horizontal cylinder 32. By a displacement of the bearings 29 in their corresponding sliding ways 30, one may adjust the spacing between the axes 15 and 16 and consequently also the tension in the chain 12. As in the press 3 according to the previous embodiment, the pressure roller 20 and 21 act upon the chains 11 and 12, respectively. The pressure rollers 21 which act upon the upper chain 12, rest freely thereon. The pressure on the chain 12 may be increased by means of vertically movable pistons 27 which slide inside cylinders 28 mounted on the frame 9 and which may act upon the bearings 23 of the rollers 21.

When no material to be compressed is present between the chains 11 and 12, the chain 12 rests on the chain 11 while, when feeding material to be compressed between the chains 11 and 12, the upper chain 12 is spaced from the chain 11.

The pistons 11 in the cylinders 32 are set under a substantially constant pressure, so that the tension in the chain 12 is maintained constant.

For example, for a determined pressure increase on one of the pistons 27, the axis 15 is automatically displaced towards the axis 16. The pressure on the piston 27 in each cylinder 28 is adjustable separately, so that the various rollers 21 may each be controlled separately.

In this way, the distance between both chains 11 and 12 may be determined accurately and easily from one spot to another, so that the thickness reduction of the fiber cake (not shown) to be compressed between these chains 11 and 12 is completely adjustable. The thickness of the compressed fiber cake is thus dependent on the thickness of the fiber layer which is fed in the press and on the pressure exerted on the pistons 27. This thickness may also be determined beforehand by means of spacing battens (not shown). The rollers 20 which act upon the lower chain 11 rest, through bearings 22, on slingers 35 of the fixed frame 9. The bearings 22 and 23 are located between vertical guides 24 which prevent a sidewise displacement of the rollers 20 and 21.

The upper chain 12 is set into motion by two driven pressure rollers 21' and 21" which, by friction on the inner side of the lower part of the chain 12, take the same along in the direction of arrow 18.

The lower chain 11 is set into motion by means of the pressure roller 20' which takes along the chain 11 by friction. A transmission 40 is further provided between the roller 20' and the axis 16, allowing to drive same whenever the pressure of the chain 11 on the roller 20' is not large enough and to prevent slipping of the chain 11 over the roller 20'. The other rollers 20 and 21 are freely rotatable in their corresponding bearings 22 and 23.

The lower part of the chain 11 rests on a conveyor band 41, which glides in turn over a supporting part 43, to prevent sagging of this lower part, under the influence of its own weight. For the same reason, the upper part of the chain 12 moves over freely rotatable supporting rollers 33.

The invention is in no way limited to the above embodiments and many changes may be brought therein without departing from the scope of the invention as defined by the appended claims.

I claim:

1. A continuous press for the manufacture of pressed fiber material comprising a base support; a first series of rollers operatively mounted on the base support; a first endless chain movably mounted on the base support and supported for a portion of its travel by the first series of rollers with an upper portion of the chain in a substantial horizontal plane; a fixed upper support attached to the base support; a series of movable hydraulic means connected respectively at one end to the fixed upper support for producing pressure on the fiber material; a bearing means connected to the other end of each hydraulic means and movable with the hydraulic means relative to the fixed upper support; a second series of rollers located above the first series of rollers and having ends of each roller supported by the bearing means of one of the series of hydraulic means; a movable support attached to some of the bearing means and movable with the bearing means relative to the fixed upper support; a second endless chain movably mounted on the movable support about the second series of rollers so that the first and second endless chains form a moving chamber for the fiber material whereby the hydraulic means exerts the desired pressure on the fiber material as it travels between the first and second endless chains.

2. A continuous press as in claim 1 where each individual hydraulic means includes control means to independently adjust the hydraulic means to provide control of the pressure exerted on the fiber material.

3. A continuous press as in claim 1 further including guide means located on both the base support and movable support to assist in supporting respectively the second and first endless chains.

4. A continuous press as in claim 1 where the movable support is connected to only the first and the last-bearing means in the series of bearing means.

5. A continuous press as in claim 1 further including removable batten means for limiting relative distance between the first and second endless chains.

6. A continuous press as in claim 1 where one of the rollers in the second series of rollers drives the second endless chain.